United States Patent Office 2,910,806
Patented Nov. 3, 1959

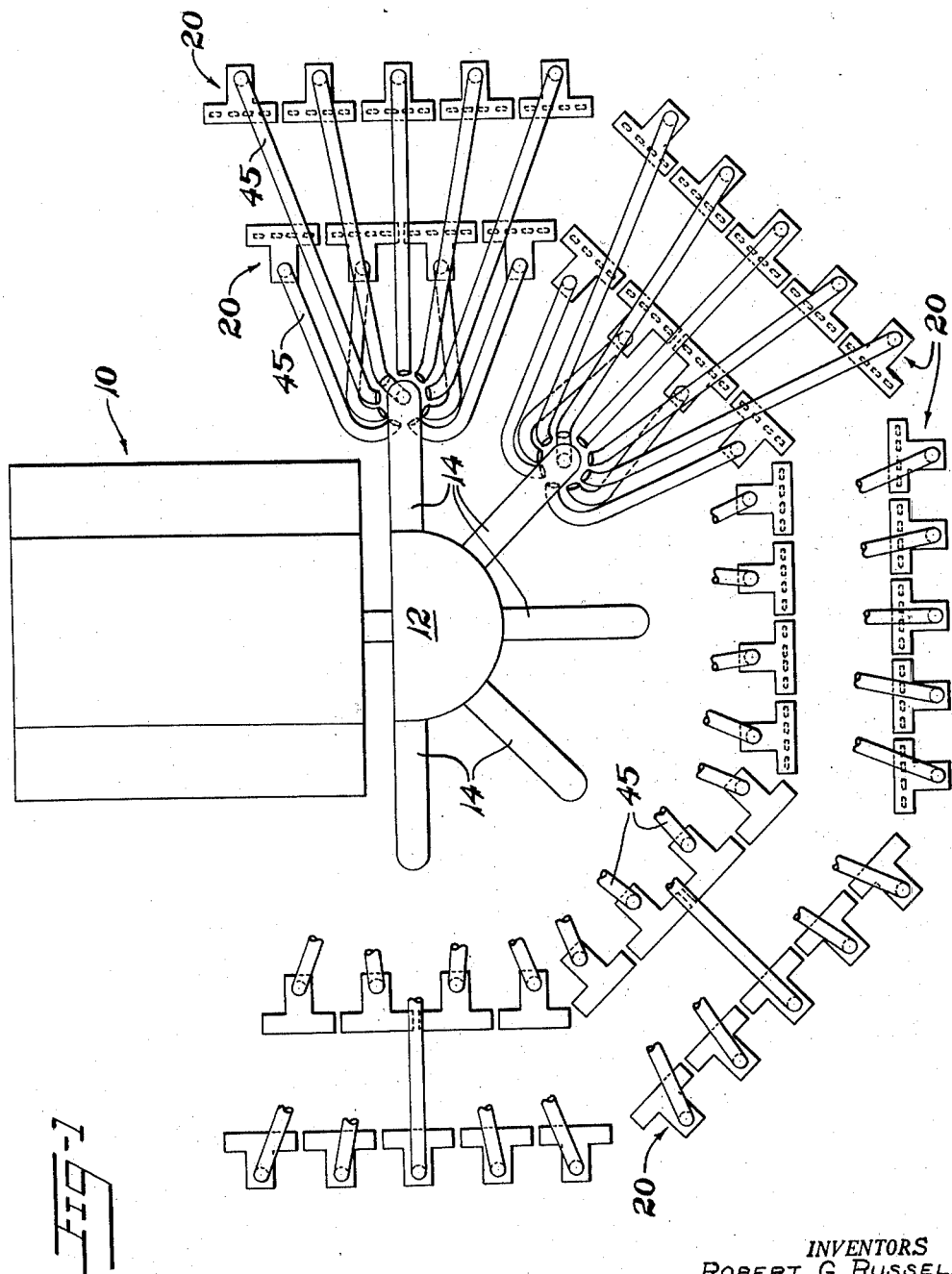

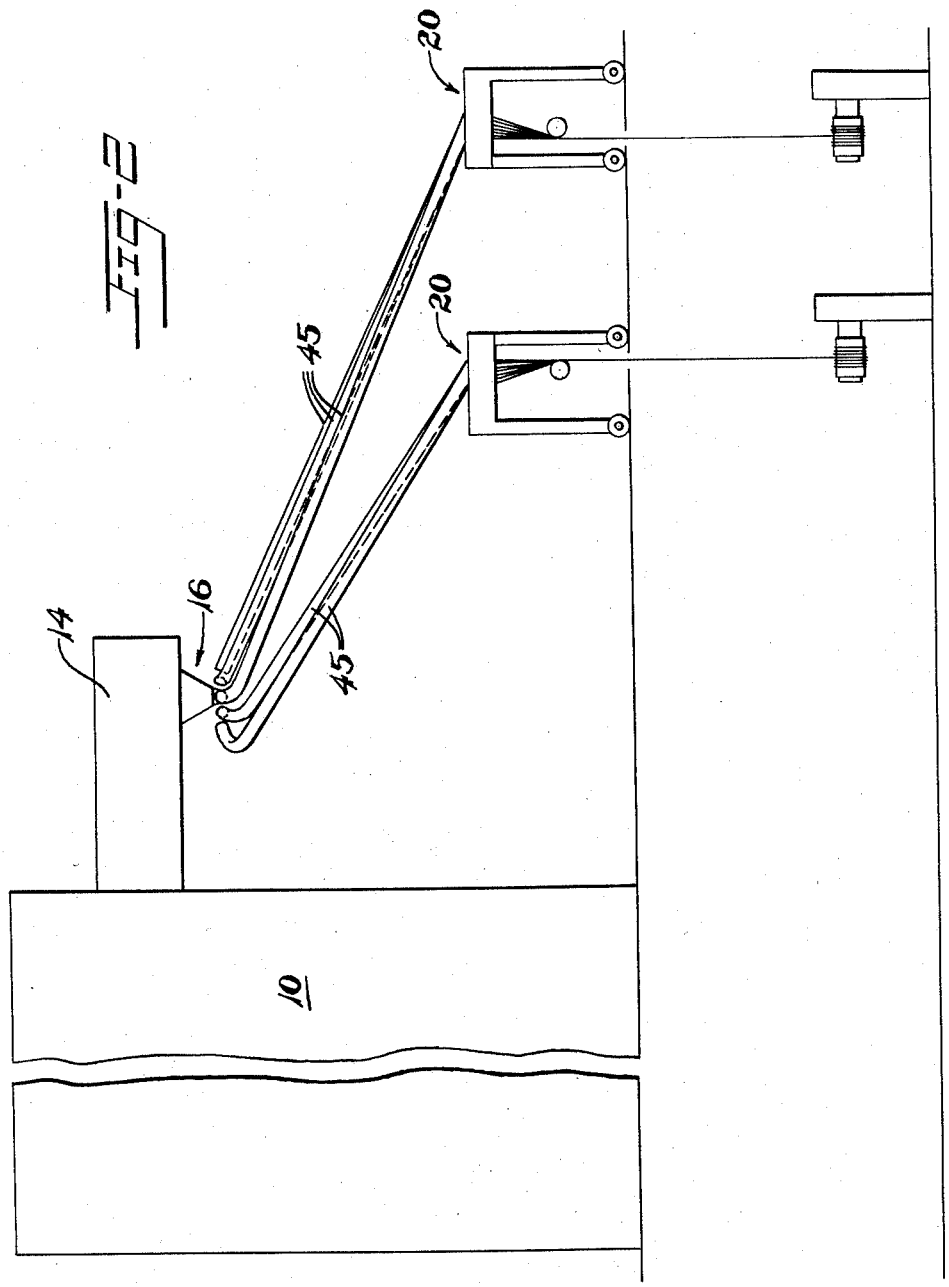

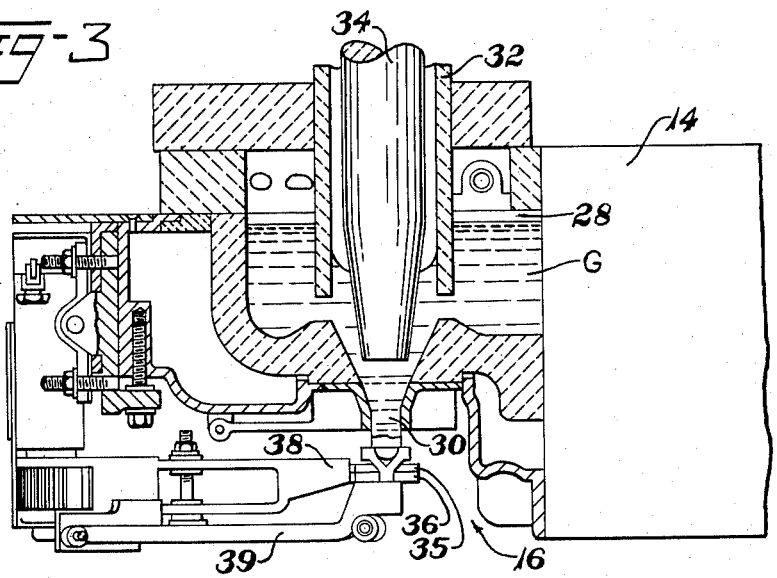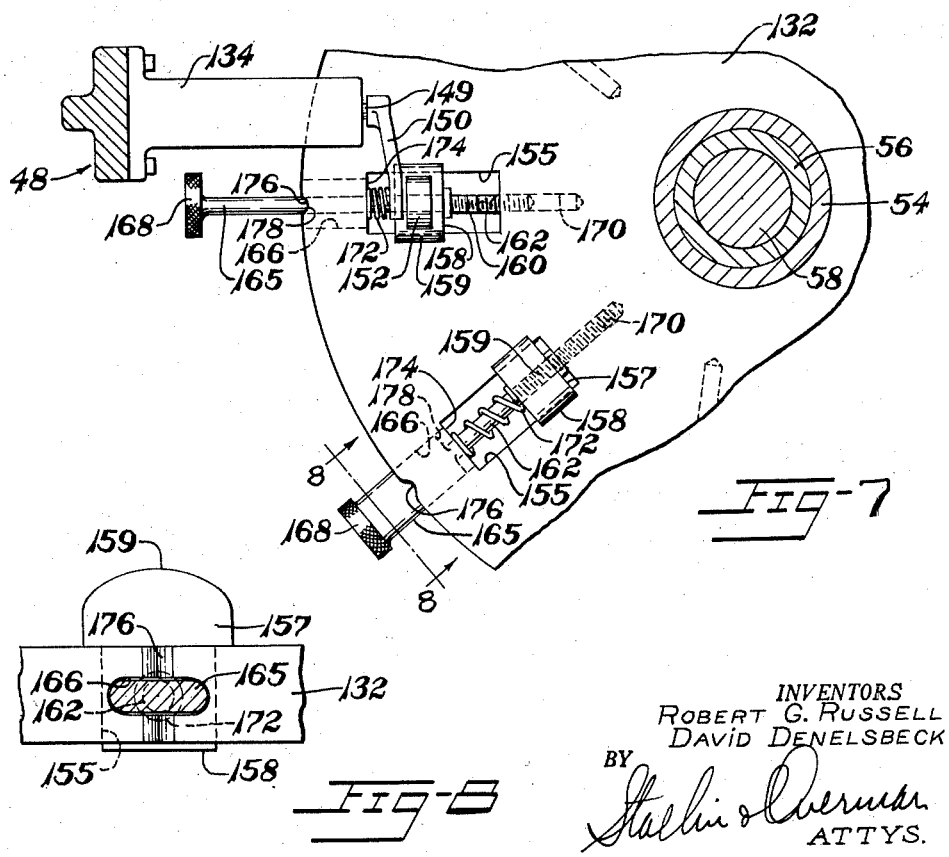

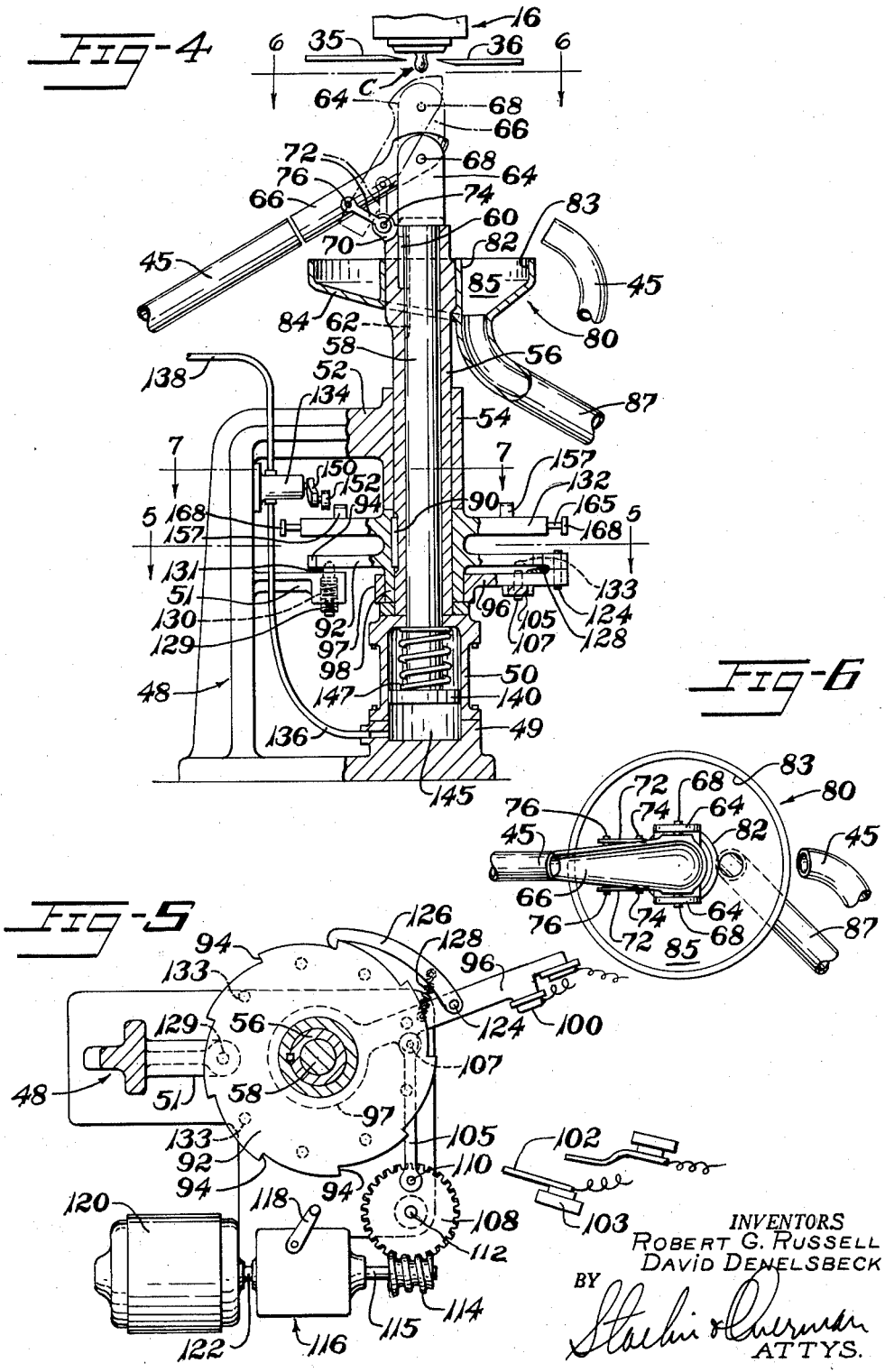

2,910,806

APPARATUS FOR FEEDING AND CONVEYING MOLTEN GLASS

Robert G. Russell, Granville, and David Denelsbeck, Newark, Ohio, assignors to Owens-Corning Fiberglas Corporation, a corporation of Delaware Application September 9, 1954, Serial No. 455,059

2 Claims. (Cl. 49—14)

This invention relates to apparatus for processing glass and more particularly to an apparatus for conditioning and processing glass to form fine fibers or filaments therefrom.

Fine glass fibers and fine continuous filaments are used in the manufacture and fabrication of textiles. Several problems have been encountered in the production of fibers or filaments for textile purposes, and usable fibers or filaments for such purposes are now being produced in limited commercial quantities.

Two of the major problems in the commercial production of textile fibers or filaments are to obtain a glass of high quality and to attain high production of fibers or filaments of uniform size at a low cost. In order to obtain a high-quality glass, the glass must be melted, maintained at a comparatively high temperature and caused to flow comparatively slowly through a considerable linear distance in order that the glass composition may be rendered homogeneous and undergo proper fining and refining. Thorough fining and refining of the glass composition are essential to the production of very fine fibers or filaments in order to remove all "seeds," bubbles and impurities from the molten glass. Such fining and refining are obtained by flowing the glass at a comparatively slow rate over a large area in order to attain a thorough mixing of the glass and the necessary quality and purity of glass usable for forming very fine fibers or filaments for weaving textiles.

Fine continuous filaments or fibers of glass suitable for use in producing textiles have been formed utilizing a comparatively small feeder bushing provided with a plurality of small orifices through which molten glass flows in the form of fine streams, the streams being attenuated or drawn to filaments or fibers of desired fineness by winding the same upon a spool in the form of a package or by engaging a strand of the filaments or fibers with a pair of rapidly rotating nip or pull rolls engaging the filaments.

Extremely fine staple fibers formed of glass have been produced and utilized to some extent commercially in fabricating twisted strands, yarns and rovings for textile uses. One method used for staple fiber production is to form primary fibers or rods from streams of glass and feed the primary fibers or rods into a blast of gases of a temperature above the attenuation temperature of the glass, the heat of the blast effecting a softening of the primary fibers or rods, the softened glass being drawn or attenuated to fine fibers by the force or velocity of the gases of the blast.

The capacity of a single feeder is comparatively small as only a few pounds of glass per hour are discharged therefrom in the production of fine fibers of either the continuous filament type or the staple fiber type. This low-capacity feeder does not permit the economic employment of a melting and refining furnace for flowing molten glass direct to the feeder as an immense quantity of heat would be wasted in maintaining the large body of glass in the furnace in a molten state when only a few pounds per hour are withdrawn for use in forming fibers.

Therefore, in producing glass for use in feeder bushings, it has been the practice to melt, fine and refine the glass composition in a medium-size furnace in order to secure the proper quality of glass and then form the refined glass into solid marbles of about one inch or less in diameter. The rate at which solid marbles may be formed is limited by the capacity of the marble-forming mechanism. The solidified marbles are subsequently fed at a comparatively slow rate of speed to the individual feeders or bushings from which streams of glass are drawn to make textile fibers. This process requires that the marbles be remelted and that the temperature of the molten glass be maintained very high in the feeders in order to render the glass in the feeders of sufficiently low viscosity whereby it will readily flow through the very small orifices in the feeder at uniform rates in order to produce fine continuous filaments or fibers of uniform diameters. The same process of remelting marbles is used in forming primary fibers or rods for the production of staple fibers by the hot blast method.

The employment of the procedure of solidifying the glass into marbles and subsequently applying heat to render the marbles molten results in the loss of an immense amount of heat; hence, the proecss is uneconomical. However, it has been used commercially because of the fine quality of filaments or fibers attained, producing excellent, high-quality textiles.

The present invention embraces an apparatus for melting, fining and refining glass, and delivering metered or measured quantities or bodes of heated glass into feeders directly from the furnace.

An object of the invention is the provision of apparatus for processing glass or other heat-softenable mineral material wherein a comparatively large furnace is provided with one or more forehearths wherein each forehearth is arranged to deliver heated glass in successive gobs or bodies which are sequentially conveyed directly to stations at which the glass is maintained at a high temperature for further proecssing.

An object of the invention is the provision of an arrangement utilizing a comparatively large number of filament or fiber-attenuating or forming stations or units, each receiving glass in heated form from a forehearth, the latter being supplied with highly refined glass from a melting tank or furnace whereby a highly efficient and economical production of fibers or filaments on a commercial scale may be carried on.

Another object of the invention resides in an apparatus wherein a number of forehearths are connected with a single material-melting and fining tank or furnace and wherein each forehearth is equipped with a material-distributing station adapted to deliver successive quantities of the material in highly heated condition, the quantities of material being successively and sequentially delivered or conveyed to processing stations or units at which the material is maintained at a substantially uniformly high temperature in a flowable state.

Another object of the invention resides in an arrangement for normally distributing successive gobs of heat-softened material from a forehearth to several processing stations in sequential order and wherein one or more of the gobs of material may be diverted from the normal channels of distribution in the event of failure or impairment of the operation of one or more of the processing stations.

Another object of the invention resides in an arrangement of distributing quantities of or gobs of glass from a central distribution zone to fiber-attenuating stations, the arrangement including means under control of the operator for diverting gobs of glass from the distribution zone away from one or more of the fiber-attenuating stations during removal and replacement of the fiber-attenuating unit at the said station without impairing the successive delivery of gobs of glass to the other fiber-attenuating units at the remaining stations whereby the operating conditions at the glass distribution zone are normally maintained.

Another object of the invention resides in the provision of an arrangement associated with a comparatively large-capacity, glass-melting and refining unit wherein a plurality of groups of fiber-attenuating units receive predetermined quantities of heat-softened glass converted into fibers through the medium of the attenuating units whereby large quantities of fine glass fibers of filaments are produced on a commercial scale with a minimum of loss of heat in the delivery of the glass from the melting and refining unit to the attenuating units.

Another object of the invention is the provision of apparatus for distributing quantities of heated glass or other heat-softened material from one or more distribution stations to one or more groups of processing stations at which processing stations the glass or other heat-softened material may be processed into fibers through the use of various methods of fiber attenuation.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a semidiagrammatic plan view illustrating various components of apparatus for carrying out the method of the invention;

Figure 2 is a semidiagrammatic elevational view illustrating components of the apparatus for forming continuous filaments or fibers;

Figure 3 is a fragmentary view, partly in section, showing a material-metering and feeding arrangement at one of the material-distributing stations;

Figure 4 is an elevational view, certain parts being shown in section, of an apparatus for distributing bodies or gobs of heat-softened material from a distribution station for delivery to material-receiving stations;

Figure 5 is a horizontal sectional view taken substantially on the line 5—5 of Figure 4;

Figure 6 is a plan view taken on the line 6—6 of Figure 4;

Figure 7 is an enlarged, fragmentary sectional view taken substantially on the line 7—7 of Figure 4;

Figure 8 is a fragmentary sectional view taken substantially on the line 8—8 of Figure 7.

While the apparatus of the invention is illustrated as particularly adapted for forming strands of fine, continuous filaments or fibers of heat-softenable material such as glass and for forming fine staple fibers therefrom, it is to be understood that the invention may be utilized for processing heat-softenable material to other forms or for other purposes.

The invention involves the use of a comparatively large melting furnace or tank furnace of a type similar to furnaces now utilized in the glass industry for molding bottles or other articles wherein large quantities of molten glass are required in carrying on commercial molding operations. In the present invention the heat-softenable material in flowable form is conveyed by one or more forehearths to a distributing station or stations at which the heat-softened material is delivered as individual gobs or bodies to units of a group in sequential order from which units the material is continuously discharged and attenuated to filaments or fibers. For purposes of this description, the method and apparatus will be described with reference to the processing of glass to filaments or fibers, but it is to be understood that the method and apparatus may be utilized in processing other heat-softenable mineral materials such as fusible rock and slag to form fibers.

Referring initially to Figures 1 and 2, a melting furnace 10, preferably of the regenerative type, is provided with a glass-melting and fining chamber from which the glass flows into a chamber or forebay contained within an enclosure 12 from which extends a plurality of forehearths 14, there being five forehearths illustrated in Figure 1. At the end zone of each of the forehearths there is provided a material-feeding and distributing station 16 having mechanism, one form of which is illustrated in Figure 3, for delivering individual gobs or bodies of heat-softened material to each of a group of material-receiving units in a manner whereby each unit receives a predetermined quantity of material in sequential order at required intervals in order to establish continuous and uninterrupted operation of fiber-forming units or stations associated with the material-receiving units or stations.

As shown in Figure 1, each forehearth is provided with means for distributing heat-softened glass to a group of stations or units 20 at which stations the material may be reheated or conditioned to desired viscosity for further processing into fibers or filaments through the application of attenuating forces.

The tank furnace 10 shown in Figure 1 is of a comparatively large capacity for melting glass batch or other mineral material from which fibers are to be formed. The central zone of the furnace is constructed of suitable refractory and provides a receptacle or tank in which the glass or other mineral material is reduced to a molten state. One end of the furnace 10 is provided with a hopper (not shown) adapted to receive glass batch or other raw material which is conveyed by the hopper into the melting receptacle or zone of the furnace. Disposed at each side of the melting zone or receptacle of the furnace is a regenerator construction of conventional construction.

Suitable burners (not shown) are arranged along the sides of the melting receptable of the furnace for burning combustible mixture in the zone or area above the glass level in the furnace receptacle. The regenerator constructions are used alternately, and the exhaust gases are moved through one regenerator chamber to heat incoming air which is introduced above the glass in the melting furnace and supports combustion of the fuel mixture supplied to the melting furnace by the burners.

The furnace of this character is of large capacity and may contain upwards of one hundred tons of glass or other mineral material. The molten material, such as glass, flows through the melting receptacle in the furnace and through a fining chamber 12 so that upon entrance into the forehearths 14 the glass is fined to a high quality free from "seeds" and impurities. The forehearths may be provided with burners (not shown) for maintaining the material in a flowable condition.

Each forehearth 14 is provided with means for periodically discharging predetermined or metered quantities, bodies or gobs of the molten material through suitable feeding and severing mechanism 16, one form of which is shown in Figure 3. In this form the end zone of the forehearth 14 is equipped with a chamber or channel 28 adapted to receive molten glass G from the adjacent forehearth 14. The chamber 28 is provided with a feeder outlet 30 and disposed above the feeder outlet is a sleeve 32 within which a plunger 34 is disposed for vertical reciprocatory movement. The lower zone of the plunger 34 is tapered, is aligned with the feeder outlet 30 and depends into the glass supply G adjacent the feed orifice or outlet 30.

Glass is fed from the supply through the orifice 30 in a manner to produce successive charges or bodies of predetermined size. Positioned below the orifice is a suitable gob-shearing mechanism provided with shear blades 35 and 36 which are actuated at the proper time to sever a gob or body of glass from the supply. The shear blades are supported by members or levers 38 and 39 which are actuated by suitable means at periodic intervals to shear a measured quantity, gob or body of the material from the material moving through the orirfice 30.

The gobs or bodies of glass discharged from the outlet or feeder station at the end of the forehearth are in a softened or plastic condition and are adapted to be individually distributed through gob-conveying means to the receiving stations or units 20 in sequential order for further processing.

As shown in Figure 1 each of the material-receiving units 20 is disposed adjacent an end of a gob-conveying member or channel 45 individual to each unit. The opposite ends of each of the channels 45 are disposed adjacent the feeder or material-distributing station 16 and are adapted to receive successive charges or gobs in sequential order for delivery or conveyance to the units of a group supplied from one forehearth.

A group of units 20 and the associated group of gob-conveying tubes or channels 45 are provided for receiving charges or gobs of material from feeding or distribution devices carried by the other forehearths. Five such groups of units or stations 20 are illustrated in Figure 1, the units or stations of each group receiving gobs of material from one of the forehearths. The large-capacity melting tank furnace 10 is adapted to continuously supply large quantities of glass or other heat-softenable mineral material to the material-receiving and processing units or stations 20.

The invention is inclusive of means of continuously distributing gobs or bodies of glass discharged from a forehearth to the units 20 in sequential order and for diverting and disposing of gobs of glass normally delivered to a unit when the said unit is out of operation for replacement or repair purposes. The arrangement for diverting gobs of glass is adapted for selective operation for any number of material-receiving units that may be out of operation.

Figures 4 through 7 illustrate a form of gob or charge-distributing means with which each forehearth is equipped for successively and sequentially delivering charges to the receiving units or stations 20 of one of the groups of the character illustrated diagrammatically in Figure 1. Referring initially to Figure 4, two of the material-conveying means 45 in the form of tubes are illustrated in this figure, the remaining tubes or conveying means of the group not being shown for clarity of illustration. Mounted upon a suitable support or floor is a frame 48 provided with a pedestal portion 49 upon which is mounted a cylinder 50. The upper portion of the frame 48 is formed with a horizontally projecting arm 52 which is provided or formed with a hollow boss or sleeve-like portion 54.

Rotatably mounted in boss portion 54 but restrained against relative vertical movement is a member or sleeve 56. Disposed within the hollow interior of member or sleeve 56 is a shaft 58 arranged for relative rotatable and longitudinal movement. A key or feather 60 is contained in a groove formed in the upper portion of sleeve 56 and extends into a groove or spline 62 formed in shaft 58. It should be noted that groove 62 is of greater length than key 60 whereby shaft 58 is arranged for vertical longitudinal movement within sleeve 56. Shaft 58 is rotatable with sleeve 56 through the medium of key 60.

The upper end of shaft 58 is provided with a bifurcated portion or member 64, and disposed between the furcations of member 64 is a material-distributing member or trough 66. The distributing means or trough 66 is mounted upon trunions or pins 68 extending through openings provided in the furcations of member 64 whereby the trough is pivotally or articulately supported upon member 64 for relative angular or tilting movement as shown in Figures 4 and 6.

The upper end of sleeve 56 is formed with a laterally projecting, bifurcated portion 70. One end of a link 72 is pivotally connected with the furcations of projecting portion 70 by means of pin 74, the other end of the link being pivotally secured with trough 66 by means of trunions or pins 76 in the manner illustrated in Figures 4 and 6. Through this arrangement, vertical movement of shaft 58 relative to sleeve 56 raises the bifurcated member 64 and elevates the upper end of trough 66, causing the trough to be tilted to the position shown in broken lines in Figure 4 under the influence of the link 72 connecting the trough 66 and the sleeve 56.

Suitable means is provided to receive the charges or gobs of heat-softened material discharged from trough 66 when the latter is in material-diverting position shown in broken lines in Figure 4. A member 80 surrounds sleeve 56 and is provided with circular inner and outer walls 82 and 83 and a bottom wall 84, forming an annular chamber 85 adapted to receive charges or gobs of material when member 66 is in the position shown in broken lines in Figure 4 and irrespective of the relative position of rotation of the trough 66. Member 80 is provided with a discharge chute or tube 87 for conveying material received in the chamber 85 to a remote position where it is either disposed of as waste or collected and returned to the furnace 10 for remelting and reuse.

In the normal operation of the apparatus, the several material-receiving and processing units 20, associated with a forehearth in the manner shown in Figure 1, sequentially receive successive charges or gobs of heat-softenable material, such as glass, through tubes or channels 45. The entrance ends of tubes or channels 45 terminate in a circular zone concentric with the axis of rotation of the trough 66 whereby, upon successive rotative movements of trough 66, the trough is brought into successive registration with the entrances of tubes or channels 45 for normal delivery of gobs or charges of glass into the tubes 45 by which they are conveyed to processing units or stations 20. When all of the processing units 20 of a group are in operating condition, trough 66 remains in the angular position shown in full lines in Figure 4 during its successive rotative movements for sequential registration with the entrances of tubes 45.

The means for rotating shaft 58 and material-distributing trough 66 is illustrated in Figures 4 and 5. Secured to sleeve 56 by means of a key 90 is a disk-like member 92 rotatable with the shaft, the member 92 having its peripheral zone formed with radial teeth or abutments 94, the number of teeth formed thereon being equal to the number of tubes 45 for conveying gobs of glass to a corresponding number of units 20 through distributing trough 66. In the present embodiment there are nine units 20 and associated tubes 45 in a group; hence, there are nine teeth 94 formed on disk 92. The angular spacing of the teeth 94 is the same as the angular spacing of the entrances of tubes 45 around the axis of rotation of shaft 58 which is aligned with the axis of the gob-feeding device 16 as shown in Figure 4.

Means is provided for effecting successive, intermittent, rotative movements of disk 92, each movement being equal to the angular spacing between adjacent teeth 94 to move the material-distributing trough 66 from a position of registration with one tube 45 to a position of registration with the adjacent tube 45. An arm 96 is formed with a hollow boss portion 97 which is journaled upon a hub portion 98 formed on disk 92, the arm being arranged for oscillation about the axis of shaft 58. The outer end of arm 96 is provided with a contact member 100 which is adapted to engage a relatively stationary contact member 102 mounted upon a stationary support 103 whenever the arm 96 is moved to one extreme position of oscillation. When contact 100 is in engagement with stationary contact 102, an electric circuit is completed through means (not shown) for reciprocating plunger 34 and actuating material-severing knives or shears 35 and 36, thus controlling delivery or discharge of a gob or charge C of glass or other heat-softenable material from feeder 16 at the end of a forehearth.

The arm 96 may be oscillated by a suitable drive means. As illustrated in Figures 4 and 5, a link 105 is pivotally joined at one end to the arm 96 by means of pin 107 and at the other end, with a gear or worm wheel 108 by a pin 110. The pin 110 is offset with respect to the axis of the shaft 112 upon which gear 108 is revolubly mounted so that rotation of gear 108 causes reciprocal motion of link 105 and oscillation of arm 96. The gear or worm wheel 108 is driven by means such as a worm 114 which is mounted upon a shaft 115 and extends into a housing 116 which contains variable-speed mechanism (not shown) for controlling the speed of worm wheel 114 and, hence, the rate of oscillation of arm 96. The speed-controlling mechanism in housing 116 may be adjusted or controlled by means of a crank or arm 118 shown in Figure 5. An electric motor 120 supplies the power for oscillating arm 96, the motor shaft 122 extending into housing 116 for driving the mechanism contained therein.

The arm 96 is provided with means engageable with the radially extending teeth or abutments 94 formed on the periphery of disk 92 to cause intermittent, rotative movement of disk 92, shaft 58 and material-distributing trough 66. As shown in Figures 4 and 5, arm 96 is equipped with a pin 124 upon which is pivotally supported a pawl or detent 126 for engagement with teeth 94. The pawl 126 is urged or biased into engagement with the periphery of the disk 92 by means of a contractile spring 128.

Through this arrangement, complete rotation of gear or worm wheel 108 completes a full cycle of oscillation or reciprocation of arm 96. The position of the elements at the beginning of a cycle is shown in Figure 5. The pawl 126 engages an abutment or tooth 94 on disk 92, and the movement of the arm 96 in a clockwise direction rotates the disk 92 through one-ninth of a revolution, moving the trough 66 from registration with one of the tubes 45 into registration with an adjacent tube in position for delivery thereto of a charge or gob of glass C. This occurs during the first half of a revolution of the gear 108. The arm 96 is moved during this period to a position in which the contact 100 on arm 96 engages stationary contact 102.

Thus, when trough 66 is in engagement with the next succeeding tube 45, the circuit for energizing the mechanism operating the gob feed plunger 34 is completed, causing plunger 34 to be reciprocated, permitting glass from the supply G to move through the orifice 30. The gob-shearing mechanism 16 is actuated by means (not shown) intercalated with the mechanism for operating plunger 34 whereby the gob-severing shears 35 and 36 are actuated to shear a gob, charge or body of glass of predetermined size from the glass moving through orifice 30.

The severed gob falls into trough 66 and is conveyed through the tube 45 in registration therewith to the processing unit 20 associated with the tube receiving the charge. During the succeeding half of a revolution of worm wheel 108, arm 96 is returned to the full-line position shown in Figure 5; and at the limit of its movement, the pawl 126 engages the next succeeding tooth or abutment 94 on disk 92 preparatory to initiating the next cycle as described above. The rate of distribution of the gobs or charges of glass to the several units 20 may be varied by adjusting the speed control mechanism contained in housing 116 by adjustment of the speed control arm or crank 118.

Means is provided for resiliently retaining the disk or plate 92 in indexed positions. The frame 48 is formed with an extension 51 which is bored to accommodate a threaded member 129. An expansive spring 130 is disposed in the bore in the projection 51 and bears against a pin 131, the upper end of which is of semispherical shape and adapted for engagement in recesses or depressions 133 formed in the lower surface of the disk member 92.

The recesses 133 are spaced circumferentially, correspond in number to the number of stations 20 receiving material from the trough 66 and are arranged at equal radial distances from the axis of the shaft 58 for successive registration with the retaining pin 131. By this means, the disk 92, shaft 58 and trough 66 are resiliently maintained in a relatively fixed position during the period that the arm 96 is swung in a counterclockwise direction as viewed in Figure 5 to bring the pawl 126 into engagement with the next succeeding tooth or abutment 94.

The arrangement shown in Figures 5 and 6 is provided with means for selectively disposing of charges of glass delivered into trough 66 in the event that a unit 20, which would otherwise receive the charges, is out of operation or is removed for purposes of repair of replacement. A means of disposing of the charge of glass which cannot be received by an inoperative unit 20 is necessary in order to obtain uninterrupted operation of the glass-feeding means as any impairment or delay in the uniform rate of discharge of gobs or charges of glass from the feeding means 16 may result in a change in the operating conditions and, hence, a change in the viscosity of the glass G contained in the supply chamber 28 of the forehearth.

One form of means for accomplishing the diversion and disposal of gobs of glass is shown in Figures 4, 6, 7 and 8. Mounted adjacent disk 92 and supported on sleeve 56 is a circular plate or disk member 132 fixedly secured to the sleeve by the key 90. The disk member 132 is provided with a plurality of means spaced circumferentially thereon, each means being individual to a normal gob-distributing position of trough 66. Two of the means are illustrated in Figure 8. Mounted upon the supporting frame 48 is a housing 134 which contains a movable valve (not shown) for controlling the flow of compressed air or other actuating medium through a tube 136, the compressed air being conveyed to the valve mechanism from a supply through a tube 138.

Disposed in cylinder 50 and secured to the lower extremity of shaft 58 is a piston 140. The space 145 beneath the piston 140 is adapted to receive air under pressure from tube 136 for elevating piston 140 and shaft 58. The piston 140 is normally biased to its lowermost position, as shown in Figure 4, by an expansive spring 147.

When piston 140 and shaft 58 are elevated by means of fluid under pressure in chamber 145, the trough 66, pivotally connected to member 64 at the upper end of shaft 58, is tilted into the position illustrated in broken lines in Figure 4, bringing its discharge end into registration with chamber 85, whereby any charge delivered into the trough 66 while it is in this position will be discharged into chamber 85 and moved by gravity through discharge tube 87 as waste material or for remelting and reuse.

The valve arrangement within housing 134 controls the flow of air or fluid under pressure into the chamber 145. The valve arrangement within housing 134 is provided with a projecting shaft 149 to which is secured an arm 150 shown in Figures 4 and 7. The end portion of arm 150 is provided with a pin on which is journaled a roller 152.

Means adapted for selective engagement with roller 152 to control the operation of the valve mechanism in housing 134 is carried by disk member 132 and is particularly illustrated in Figures 4, 7 and 8. Two of such means are illustrated in Figure 7: one in normal position, the other in position to cause diversion of a gob of glass by the trough 66. The disk member is formed with radially disposed, rectangular openings 155. Each of the openings 155 accommodates a rectangularly shaped cam block 157 having a tenon portion 158.

The block 157 is formed with a cam surface 159 shaped so that when block 157 moves into registration with roller 152, the surface 159, engaging roller 152, causes swinging movement of arm 150 to actuate the valve contained in housing 134. The tenon portion 158 is formed with a threaded opening adapted to receive threaded portion 160 of a rod 162.

The rod 162 is formed with a portion 165 of substantially rectangular cross section, a shown in Figures 8 and 9, which projects through an opening 166 of reciprocal shape formed at the peripheral zone of member 132, the portion 165 being slidably fitted in opening 166. The portion 165 is provided with a manipulating knob 168 by which the rod 162 may be moved longitudinally for shifting the position of the cam block 157 to bring the block 157 into and out of registration with roller 152 on arm 150.

The opposite end of the rod 162 extends into a bore 170 which serves as a guide therefor. An expansive coil spring 172 is disposed between an outer wall of the tenon portion 158 and an end wall 174 of opening 155. The spring 172 urges or biases the block 157 to its innermost position as shown in the lowermost construction illustrated in Figure 7. The periphery of disk member 132 is formed with vertically extending recesses or grooves 176, one for each cam block construction.

When it is desired to move the abutment block 157 outwardly to occupy a position for engagement with the valve controlling roller 152, the operator grasps the knob 168 and, exerting force outwardly, moves the shaft 162 and block 157 outwardly to the position shown at the uppermost illustration of cam block arrangement shown in Figure 7. The operator turns the knob 168 through 90° about the axis of rod 162, moving the inner edges 178 of the rectangular portion 165 into registration with the adjacent groove 176 in member 132.

The edges 178 engage in the groove 176 and, under the expansive pressure of compressed spring 172, the block 157 is held in the path of roller 152. At each contact of the cam block with roller 152, the valve mechanism in housing 134 is moved to direct compressed air through a tube 136 into the cylindrical chamber 145 to elevate the shaft 58 and change the relative angular position of trough 66 to discharge the immediate gob or charge of glass into the chamber 85.

It should be noted that by reason of the provision of independently operable means for each of the respective charge-delivering positions of trough 66, the gobs or charges of glass normally conveyed to the units 20 may be diverted from a unit or units, depending upon the relative gob-discharging positions of the trough 66. Thus, if one of the processing units 20 is out of operation, the operator manipulates the rod 162 of the cam block 157 corresponding to the inoperative unit to bring the cam block 157 into a path for engagement with roller 152. Thus, at each rotation of the disk 132 the cam block 157 corresponding to an inoperative unit 20, actuates the valve in housing 134 to direct compressed air into chamber 145, elevating the shaft 58 and moving trough 66 to an acutely downwardly inclined position shown in Figure 4 to deliver the gob of glass at this station into the glass disposal chamber 85 in lieu of its normal delivery into the adjacent tube 45. Any number of the control blocks 157 may be brought into operative or inoperative position by manipulating the rods 162 to change the positions of the cam blocks 157.

The gob-conveying tubes or channels and the distributor member 66 are preferably formed of metal which will not contaminate the glass to any appreciable extent as the glass for use in forming textile fibers or filaments must be substantially free from impurities. Polished cast iron has been found to impart a minimum of contamination to the glass, but other metals such as stainless steel and alloys of platinum or other rare metals may be used for the channels 45 and distributor 66.

From the foregoing description it will be seen that this invention provides an apparatus for processing glass or other heat-softenable material to fibers through the utilization of a large number of glass-processing units 20 arranged in groups, the units of each group continuously and sequentially receiving predetermined controlled quantities, gobs or bodies of the glass or other material at uniform rates of delivery from forehearths receiving molten glass from a central supply or large capacity melting furnace. Through the apparatus of the invention, large quantities of high-quality staple fibers or continuous filaments of desired size may be obtained at a low cost utilizing a central glass supply as the glass can be melted and fined at a much lower cost in large quantities than is possible with small individual furnaces, melters or feeders.

The apparatus provides for disposition of charges of material which otherwise would be normally delivered to one or more units when the same are out of operation so that there is no interruption in the operating conditions of the forehearth, furnace and material-distributing means. The provision of a battery of groups of portable glass-processing units of the instant invention greatly reduces the amount of labor involved in forming fibers from glass as compared with prior arrangements as one operator can supervise a number of the attenuating units. The method and apparatus may be carried on automatically and continuously, and repairs may be made to individual processing units without impairing or shutting down the furnace or the material-distributing and delivering apparatus.

It is apparent that, within the scope of the invention, modifications and different arrangements may be made other than is herein disclosed, and the present disclosure is illustrative merely, the invention comprehending all variations thereof.

We claim:

1. Apparatus of the character disclosed, in combination, a group of material-receiving units, each of said units being adapted and positioned to periodically receive gobs of heat-softened material from a supply, a central material-distributing member arranged to be moved to positions to successively supply gobs of heat-softened material to the units of the group, material-conveying means individual to each unit for conducting gobs of material from the central distributing member to the units, automatically operable means for periodically moving the distributing member into successive registration with said material conveying means, means for raising and tilting said distributing member to selectively move the distributing member out of registry with a material conveying means to divert gobs of material therefrom when the material receiving unit associated therewith is out of operation, and manually movable means individual to each material conveying means and operable to selectively actuate the raising and tilting means.

2. Apparatus of the character disclosed, in combination with a glass-melting furnace of large capacity having a plurality of forehearths receiving molten glass therefrom, a glass feeder outlet for each of said forehearths, means for discharging bodies of heat-softened glass from each outlet, a group of glass-receiving stations associated with each of said forehearths, each of the stations of a group being adapted to receive bodies of glass in sequential order from the adjacent forehearth outlet, a relatively movable member disposed adjacent each of the forehearth feeder outlets adapted to receive the bodies of glass successively discharged therefrom, a glass body conveying means individual to each glass-receiving station, the body-receiving ends of the conveying means for each group of glass-receiving stations being disposed adjacent the movable member receiving bodies from the forehearth outlet supplying the group, automatic means for periodically moving each member into registration with the glass body conveying means of a group in sequential order to deliver successive glass bodies to the receiving stations of the group, means for raising and tilting each of the members to selectively move the same out of registry with a body conveying means, and manual means individual to each body conveying means and operable to selectively actuate the raising and tilting means to divert bodies of glass away from a conveying means whose associated glass receiving station is out of operation during each cycle of periodic movements of a relatively movable member through successive positions of registration with the adjacent group of body conveying means.

References Cited in the file of this patent

UNITED STATES PATENTS

| | | |
|---|---|---|
| 1,575,370 | Lorenz | Mar. 2, 1926 |
| 1,766,979 | Canfield | June 24, 1930 |
| 1,976,194 | Rowe | Oct. 9, 1934 |
| 2,013,463 | Headley et al. | Sept. 3, 1935 |
| 2,052,578 | McNamara | Sept. 1, 1936 |
| 2,121,143 | Engels | June 21, 1938 |
| 2,192,524 | Powell | Mar. 5, 1940 |
| 2,220,433 | Wellech | Nov. 5, 1940 |
| 2,267,019 | Esser | Dec. 23, 1941 |
| 2,294,266 | Barnard | Aug. 25, 1942 |
| 2,512,811 | Shuck | June 27, 1950 |
| 2,587,914 | Smith | Mar. 4, 1952 |
| 2,635,389 | Toulmin | Apr. 21, 1953 |
| 2,637,429 | Pond | May 5, 1953 |
| 2,669,805 | Rowe | Feb. 23, 1954 |

FOREIGN PATENTS

| | | |
|---|---|---|
| 132,408 | Australia | May 2, 1949 |
| 689,297 | Great Britain | Mar. 25, 1953 |